United States Patent
Jen et al.

(10) Patent No.: US 11,968,206 B2
(45) Date of Patent: *Apr. 23, 2024

(54) NON-CUSTODIAL TOOL FOR BUILDING DECENTRALIZED COMPUTER APPLICATIONS

(71) Applicant: Magic Labs, Inc., San Bruno, CA (US)

(72) Inventors: Fei-Yang Jen, San Francisco, CA (US); Yi Wei Chen, San Francisco, CA (US); Jaemin Jin, San Francisco, CA (US); Hanyu Xue, San Francisco, CA (US); Wentao Liu, San Francisco, CA (US); Shang Li, San Francisco, CA (US)

(73) Assignee: Magic Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,531

(22) Filed: Sep. 15, 2023

(65) Prior Publication Data

US 2024/0007460 A1    Jan. 4, 2024

Related U.S. Application Data

(63) Continuation of application No. 18/148,934, filed on Dec. 30, 2022, now Pat. No. 11,818,120, which is a
(Continued)

(51) Int. Cl.
*H04L 29/06* (2006.01)
*G06F 21/45* (2013.01)
(Continued)

(52) U.S. Cl.
CPC .......... *H04L 63/083* (2013.01); *G06F 21/45* (2013.01); *H04L 9/14* (2013.01); *H04L 63/0478* (2013.01)

(58) Field of Classification Search
CPC ..... H04L 63/083; H04L 9/14; H04L 63/0478; G06F 21/45
See application file for complete search history.

(56) References Cited

U.S. PATENT DOCUMENTS 9,002,018 B2 * 4/2015 Wilkins ................ H04L 9/0891
                                                          713/168
9,866,545 B2 * 1/2018 Beecham ............ H04L 63/0281
(Continued)

FOREIGN PATENT DOCUMENTS

CN          105721502 A          6/2016
CN          108432180 A          8/2018
(Continued)

OTHER PUBLICATIONS

"U.S. Appl. No. 17/031,372, Examiner Interview Summary dated Oct. 18, 2022", 3 pgs.
(Continued)

*Primary Examiner* — Kambiz Zand
*Assistant Examiner* — Afaq Ali
(74) *Attorney, Agent, or Firm* — Schwegman Lundberg & Woessner, P.A.

(57) ABSTRACT

A mechanism for building decentralized computer applications that execute on a distributed computing system. The present technology works within a web browser, client application, or other software and provides access to decentralized computer applications through the browser. The present technology is non-custodial, wherein a public-private key pair, which represents user identity, is created on a client machine and then directly encrypted by a third-party platform without relying on one centralized computing system.

20 Claims, 16 Drawing Sheets

Related U.S. Application Data continuation of application No. 17/031,372, filed on Sep. 24, 2020, now Pat. No. 11,546,321.

(60) Provisional application No. 62/904,689, filed on Sep. 24, 2019.

(51) Int. Cl.
  *H04L 9/14* (2006.01)
  *H04L 9/40* (2022.01)

(56) References Cited

U.S. PATENT DOCUMENTS

| | | | |
|---|---|---|---|
| 10,225,084 B1* | 3/2019 | Machani | H04L 63/083 |
| 10,454,683 B2 | 10/2019 | Weimer et al. | |
| 10,742,422 B1* | 8/2020 | Jarjoui | H04L 9/0631 |
| 11,546,321 B2 | 1/2023 | Jen et al. | |
| 2005/0160298 A1 | 7/2005 | Reno | |
| 2007/0192842 A1 | 8/2007 | Beaulieu et al. | |
| 2011/0239285 A1 | 9/2011 | Shi et al. | |
| 2013/0074158 A1 | 3/2013 | Koskimies et al. | |
| 2013/0311773 A1 | 11/2013 | Solin et al. | |
| 2014/0149741 A1 | 5/2014 | Balakrishnan et al. | |
| 2014/0164776 A1 | 6/2014 | Hook et al. | |
| 2014/0351586 A1 | 11/2014 | Hook et al. | |
| 2014/0373126 A1 | 12/2014 | Hussain et al. | |
| 2016/0323244 A1 | 11/2016 | Carncross et al. | |
| 2016/0366122 A1 | 12/2016 | Rykowski et al. | |
| 2017/0099280 A1 | 4/2017 | Goel et al. | |
| 2017/0109752 A1 | 4/2017 | Hubbard et al. | |
| 2018/0167367 A1 | 6/2018 | John et al. | |
| 2018/0212762 A1 | 7/2018 | Peddada et al. | |
| 2018/0227297 A1 | 8/2018 | Celik | |
| 2018/0302400 A1 | 10/2018 | Covdy et al. | |
| 2018/0330368 A1 | 11/2018 | Slupesky et al. | |
| 2018/0349891 A1 | 12/2018 | Putre et al. | |
| 2019/0220859 A1 | 7/2019 | Weight et al. | |
| 2019/0268153 A1 | 8/2019 | Kurian | |
| 2019/0280864 A1* | 9/2019 | Cheng | H04L 9/3247 |
| 2019/0305952 A1* | 10/2019 | Hamel | H04L 9/0897 |
| 2020/0213323 A1 | 7/2020 | Krstic et al. | |
| 2021/0092108 A1 | 3/2021 | Jen et al. | |
| 2022/0248228 A1* | 8/2022 | Mattsson | H04W 12/08 |
| 2023/0139222 A1 | 5/2023 | Jen et al. | |

FOREIGN PATENT DOCUMENTS

| | | |
|---|---|---|
| CN | 108476133 A | 8/2018 |
| CN | 114788226 A | 7/2022 |
| WO | WO-2019171163 A1 | 9/2019 |
| WO | WO-2021062020 A1 | 4/2021 |

OTHER PUBLICATIONS

"U.S. Appl. No. 17/031,372, Non Final Office Action dated May 17, 2022", 24 pgs.

"U.S. Appl. No. 17/031,372, Notice of Allowance dated Nov. 8, 2022", 12 pgs.

"U.S. Appl. No. 17/031,372, PTO Response to Rule 312 Communication dated Dec. 1, 2022", 2 pgs.

"U.S. Appl. No. 17/031,372, Response filed Oct. 21, 2022 to Non Final Office Action dated May 17, 2022", 24 pgs.

"U.S. Appl. No. 18/148,934, Examiner Interview Summary dated Jun. 28, 2023", 3 pgs.

"U.S. Appl. No. 18/148,934, Examiner Interview Summary dated Sep. 11, 2023", 2 pgs.

"U.S. Appl. No. 18/148,934, Final Office Action dated Aug. 16, 2023", 17 pgs.

"U.S. Appl. No. 18/148,934, Non Final Office Action dated Apr. 13, 2023", 16 pgs.

"U.S. Appl. No. 18/148,934, Response filed Jul. 13, 2023 to Non Final Office Action dated Apr. 13, 2023", 23 pgs.

"U.S. Appl. No. 18/148,934, Response filed Sep. 7, 2023 to Final Office Action dated Aug. 16, 2023", 13 pgs.

"European Application Serial No. 20868333.4, Extended European Search Report dated Oct. 17, 2022", 7 pgs.

"European Application Serial No. 20868333.4, Response filed Apr. 27, 2023 to Extended European Search Report dated Oct. 17, 2022", 15 pgs.

"International Application Serial No. PCT/US2020/052533, International Preliminary Report on Patentability dated Apr. 7, 2022", 8 pgs.

"International Application Serial No. PCT/US2020/052533, International Search Report dated Feb. 2, 2021", 2 pgs.

"International Application Serial No. PCT/US2020/052533, Written Opinion dated Feb. 2, 2021", 6 pgs.

"U.S. Appl. No. 18/148,934, Notice of Allowance dated Sep. 28, 2023", 14 pgs.

"Chinese Application Serial No. 202080081118.5, Office Action mailed Dec. 6, 2023", W/English Translation, 21 pgs.

* cited by examiner

NON-CUSTODIAL TOOL FOR BUILDING DECENTRALIZED COMPUTER APPLICATIONS

CLAIM FOR PRIORITY

This application is a continuation of and claims the benefit of priority of U.S. application Ser. No. 18/148,934, filed Dec. 30, 2022, which is a continuation of and claims the benefit of priority of U.S. application Ser. No. 17/031,372, filed Sep. 24, 2020, which claims the benefit of priority of U.S. Provisional Application Serial No. 62/904,689, filed Sep. 24, 2019, each of which is hereby incorporated by reference in its entirety.

BACKGROUND

Keeping user data secure has been an important issue for a long time. Most applications today are built with username/email/phone+password security model, which are obsolete for many reasons. For example, password leaks have become prevalent. If there exists a database with passwords, its often only a matter of time before they get stolen by sophisticated hackers that will attempt to monetize the password data.

In fact, even hashed and salted passwords are insecure. Once a database of hashed passwords is stolen, hackers can direct immense distributed computing resources at that database of passwords, utilizing parallel GPUs or botnets with hundreds of thousands of nodes to attempt hundreds of billions of password combinations per second in hopes of recovering plaintext identifier-password pairs.

Once attackers discover a password that hashes to the same hash as the one stored in the database, they'll take that identifier-password pair and try it on other applications like bank accounts. In many cases, a salted and hashed password database can give up another valid identifier-password pair around every minute. This results in about half a million leaked passwords per year on its own—doubling every few years. For companies using passwords as secrets to encrypt sensitive data, it's very much like symmetric encryption where the encryption key is a weak password that can be easily cracked by brute-force.

Additionally, user sessions are often hijacked after successful authentication, allowing attackers to exploit that user's application resources. In order to prevent such access, a system would need to re-authenticate a user with every user request. This creates an extremely cumbersome user experience if users have to type in their password at every single request.

What is needed is an improved system for securing data.

SUMMARY

The present technology, roughly described, provides a non-custodial authentication system for building decentralized computer applications that execute on a distributed computing system. The present technology works within a web browser, client application, or other software and provides access to decentralized computer applications through the browser. The present technology is non-custodial, wherein a public-private key pair, which represents user identity, is created on a client machine and then directly encrypted by a third-party platform without relying on one centralized computing system.

The present system uses public-private key pairs, generated for each user and application combination, to perform an act related to identity authentication and authorization. The non-custodial key management system of the present technology uses a hardware security module (HSM), located over a network and remote from the user's device, to store key information and perform encryption and decryption using a master key that cannot be exported.

In some instances, a method performs non-custodial authentication for a client. The method may begin with generating a private key by the client, wherein the client is associated with a user. A decentralized identifier token (DIDT) can be generated, at a client, from the private key. The user can then be authenticated for an application based on the DIDT.

In some instances, a non-transitory computer readable storage medium can have embodied thereon a program. The program can be executable by a processor to perform a method for performing non-custodial authentication for a client. The method may begin with generating a private key by the client, wherein the client is associated with a user. A decentralized identifier token (DIDT) can be generated, at a client, from the private key. The user can then be authenticated for an application based on the DIDT.

In some instances, a system can perform non-custodial authentication for a client. The system can include a server having memory and a processor. The memory can include one or more modules stored in the memory and executed by the processor. When executed by the processor, the system can generate a private key by the client, wherein the client is associated with a user. The system may further generate, at the client, a decentralized identifier token (DIDT) from the private key. The system can then authenticate the user for an application based on the DIDT.

DETAILED DESCRIPTION

Figure 1:
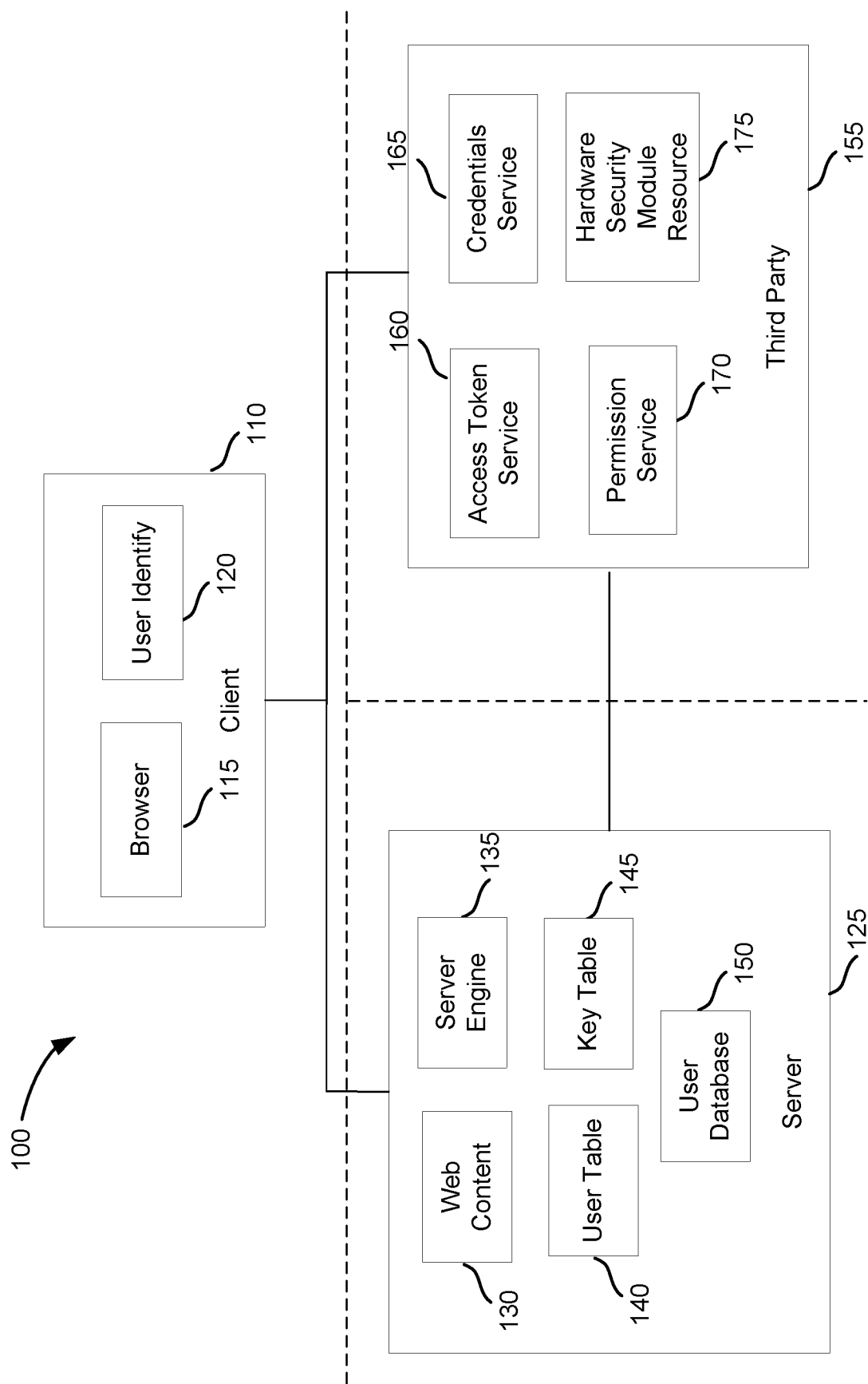
FIG. 1 is a block diagram of a delegated key management system.

The present technology, roughly described, provides a non-custodial authentication system for building decentralized computer applications that execute on a distributed computing system. The present technology works within a web browser, client application, or other software and provides access to decentralized computer applications through the browser. The present technology is non-custodial, wherein a public-private key pair, which represents user identity, is created on a client machine and then directly encrypted by a third-party platform without relying on one centralized computing system The present system uses public-private key pairs, generated for each user and application combination, to perform an act related to identity authentication and authorization. The non-custodial key management system of the present technology uses a "hardware wallet" system, located over a network and remote from the user's device, to store key information and perform encryption and decryption.

Decentralized authentication is provided using key pairs generated by the present system. The system provides a key pair to a user, which can be used to sign an authentication token (decentralized identifier token, or DIDT). The key represents the user's identity. The generated token can be used to authenticate and authorize user actions. The key pairs can be used to implement delegated key management, or non-custodial key management.

The present mechanism can be used with third-party systems that provide a platform to implement serverless architecture. The platform may be a global platform for serverless application, such as for example Amazon, Inc. Other third-party platforms may be used as well.

The present technology described herein addresses technical problems related to managing user identify and protecting the authentication and authorization process. Mistakes lead to unauthorized access and even financial loss from compromised user privacy or identity. Most application use username and password combinations to determine a user identify. These methods are obsolete at least because passwords leaks are prevalent, and resources can be used to recover hashed passwords that have been stolen from company resources. Cryptographic standards can also be used to protect data, and have been used in state-of-the-art security systems. However, consumer deployment of cryptography-based security has failed to provide an acceptable user experience. For example, cryptographic keys are computer-generated, long strings of text that can't be changed, so they're hard for users to work with. Further, it can be very difficult, often impossible, to recover from loss or theft of a private key.

The present technology solves the technical problem related to managing user identify and protecting the authentication and authorization process. The present technology uses key management techniques and a decentralized identifier token (DIDT) to manage user identity. The key management involves using remote hardware security modules (HSMs) to encrypt a private key generated at a client. The present technology provides a decentralized solution with protection that is more secure than passwords and usernames, but provides an additional benefit of being able to decrypt a private key if the key is lost on the client device.

FIG. 1 is a block diagram of a delegated key management system. Block diagram 100 of FIG. 1 includes client 110, server 125, and third-party system 155. Client 110 includes browser 115 and user identity 120. User identity may include user identification information, metadata, and other data associated with the user of the overall system. Browser 115 may include an application that renders network content, including content pages, through an interface.

Server 125 includes web content 130, server engine 135, user table 140, key table 145, and user database 150. Web content 130 is content provided by server 125 to browser 115 at client 110. The web content includes content pages, interfaces, and other information for allowing a user at client 110 to access a delegated key management system. Server engine 135 includes an API for connecting to server 125. User table 140 includes user metadata and identification information for the user. Key table 145 includes an encrypted key that is stored for each user. The user database includes identification information for each user.

Client 110 and server 125 may be used with a variety of different third-party systems to provide a delegated key management system. The modules discussed with respect to third-party 155 are exemplary, and other types of third-party systems are intended to be compatible with server 125 and client 110.

Third-party system 155 includes one or more servers that provide access token service 160, credentials service 165, permission service 170, and hardware security module resource 175. Access token service 160 can generate and provide a token to a user. Credentials service 165 handles credentials for the particular user. Permission service 170 is used to process a received request with a credential. For example, the permission service can perform checks to see if the user has permission to access a resource. Hardware security module resource 175 provides security for users to encrypt and decrypt data. Credentials service 165 provides direct access into the third-party system bypassing server 125.

In operation, a user at client 110 may perform authentication through server 125. The server 125 may then communicate with the third-party system, and the third-party system may then generate a token for the end-user. The token can be used to exchange for a specific credential. For example, the credential can be used to access the hardware security module resource 175 to encrypt and decrypt on the client side. Providing a token, obtaining a credential, and performing transactions are discussed in more detail below with respect to FIGS. 2-10.

Figure 2A:
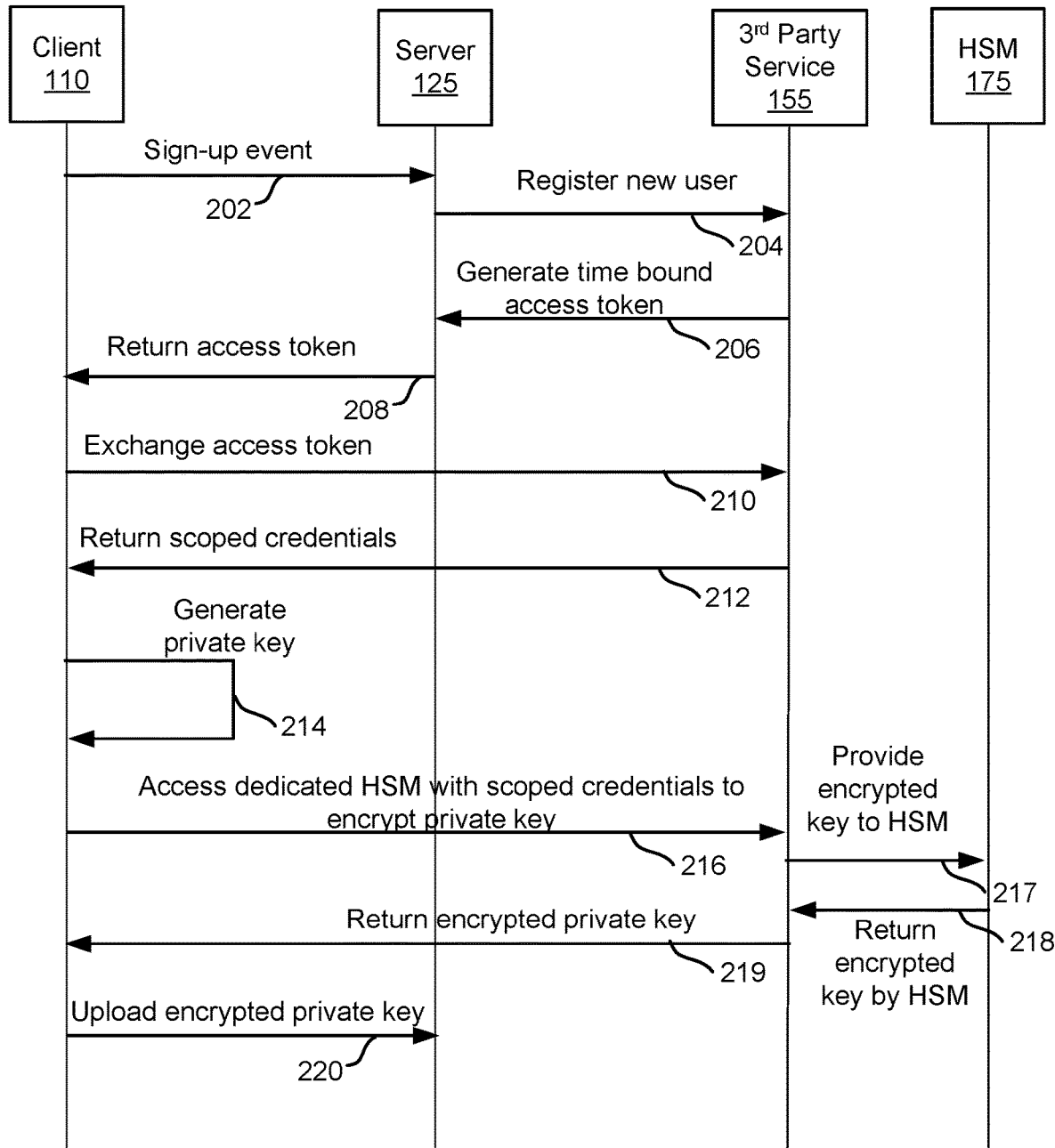
FIG. 2A illustrates a process for generating a private key in a non-custodial system.

FIG. 2A illustrates a process for generating a private key in a non-custodial system. FIG. 2 includes client 110, server 125, third party service 155, and hardware security module 175. Operations 202-220 occur between the elements 110, 125, 155, and 175. First, a sign-up event is detected at client 202. A sign-up event may include a new account request initiated by a user at the client device. A sign-up request message 202 is transmitted from the client 110 to server 125. The server 125 receives the sign-up message 205 and authenticates the user. Authentication can include sending an email to an email account associated with the user that initiated the sign-up event.

After authenticating the user, the server generates a new user request message 204. The new user request message is transmitted from server 125 to third party service 155. The third-party service receives the new user request, generates a time bound access token, and transmits the token to server 125 at 206. The time bound access token may include time-to-live (TTL) data embedded within the token. The server forwards the time bound token to client 110 at 208. The time bound token allows client 110 to directly communicate with third party service 155.

The client 110 transmits the time bound access token to third party service 155 at 210. The third party service receives the access token (e.g., time bound access token), generates a master key and scoped credential (e.g., a record that contains authentication information), and transmits the scoped credential to the user at step 212. By providing the scoped credentials to the user, the user is enabled to work with the third-party service to access their master keys stored on the third party service, for example for encryption and decryption. The server is bypassed in this step, and cannot forge or intercept the scoped credentials. In some instances, the access token and scoped credentials can be created dynamically by the third-party service, with audit logs and with a time-to-live (TTL) enabled.

The client generates a public-private key pair based on the scoped credentials at step 214. The public-private key pair is generated within a JavaScript iframe implemented within a network browser at the client. The iframe is inaccessible to the application which may be integrating the present technology. The public-private key pair can be generated using cryptography, for example cryptographically secure pseudo-random 256-bit entropy. In some instances, the public-private key pair can be generated using ECDSA (secp256k1) algorithm, which can also be used to sign a payload and validate a DIDT. Once generated, the generated key pair and the scoped credentials are transmitted to the hardware security module at step 216. The hardware service module is dedicated for the user and the particular application. The hardware service module receives the private key and scoped credentials, encrypts the private key using a master key, and transmits the encrypted private key back to the client at step 218. After the keys are encrypted, the key is stored on the iframe of the client network browser and a copy of the encrypted key is uploaded to server 125 at step 220. The uploaded copy of the key can be used to recover the user's identity. When a user subsequently authenticates, the encrypted private key is accessed by the client from the iframe, and the users can decrypt the encrypted key directly with the third-party service.

Figure 2B:
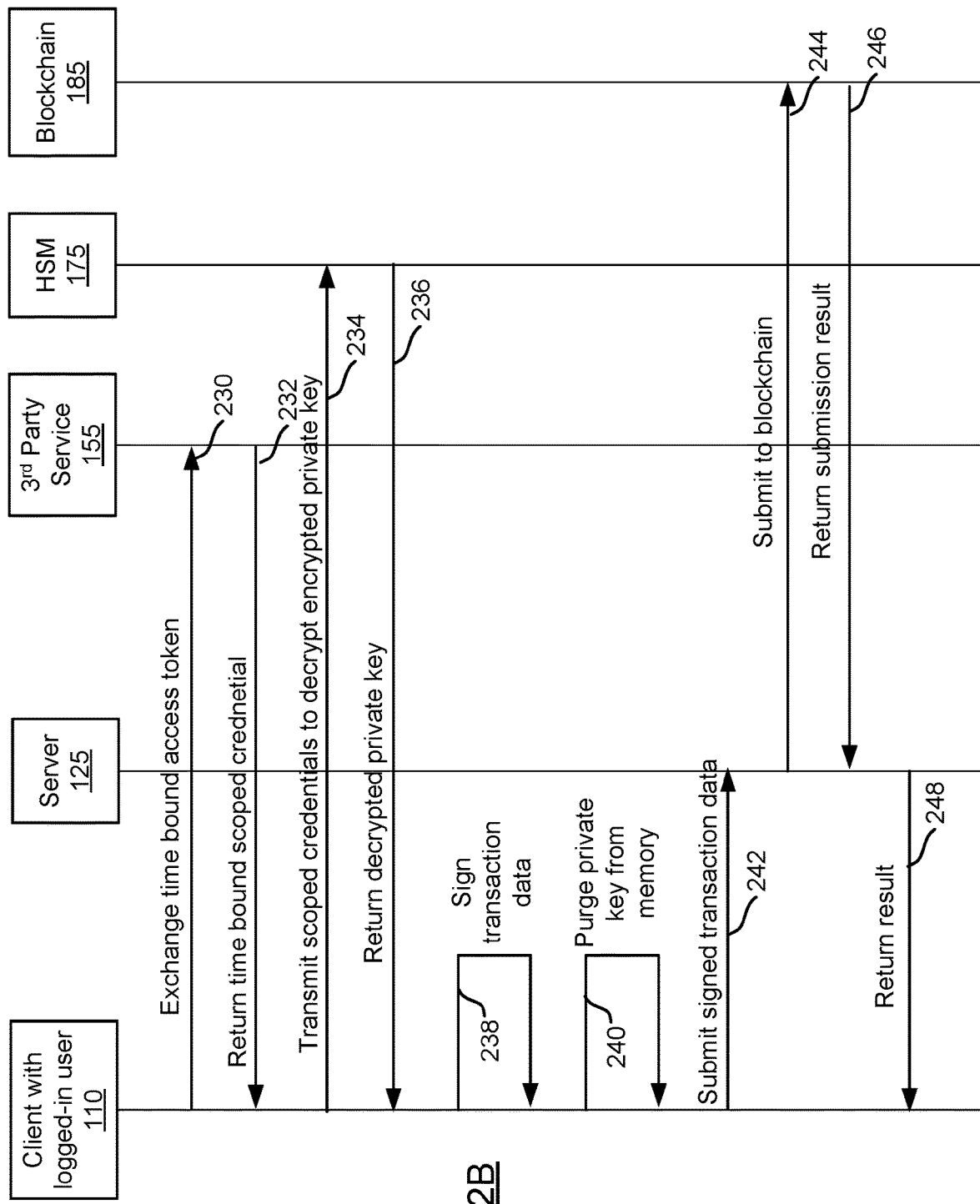
FIG. 2B illustrates a method for signing a transaction by a user.

FIG. 2B illustrates a method for signing a transaction by a user. In FIG. 2B, the communicating elements are a client with a user logged in 110, a server 125, a third-party service 155, a hardware security module 175, and a blockchain service 185. The client with the user logged in provides a time bounded access token to third-party service at step 230. The third-party service receives the access token, generates a scoped credential, and transmits the scoped credential back to the client at step 232. The scoped credentials are then transmitted to the hardware security module by the client at step 234. The scoped credentials are transmitted to decrypt an encrypted private key. The hardware security module receives the scoped credentials, decrypts the encrypted private key using the scoped credentials, and returns the decrypted private key at step 236. Once the decrypted private key is received by the client, the client can use the decrypted private key to sign transaction data at step 238. The private key may be purged from memory at the client at step 240. The signed transaction data than may then be submitted to the server at step 242. Server 125 may then submit the signed transaction data to a blockchain service 185 at step 244. Once received, the sign transaction data is stored by the blockchain 185, and a confirmation or submission result is returned to the server 125 at step 246. Upon receiving the submission result, the result is returned to the client from the server at step 248.

Figure 2C:
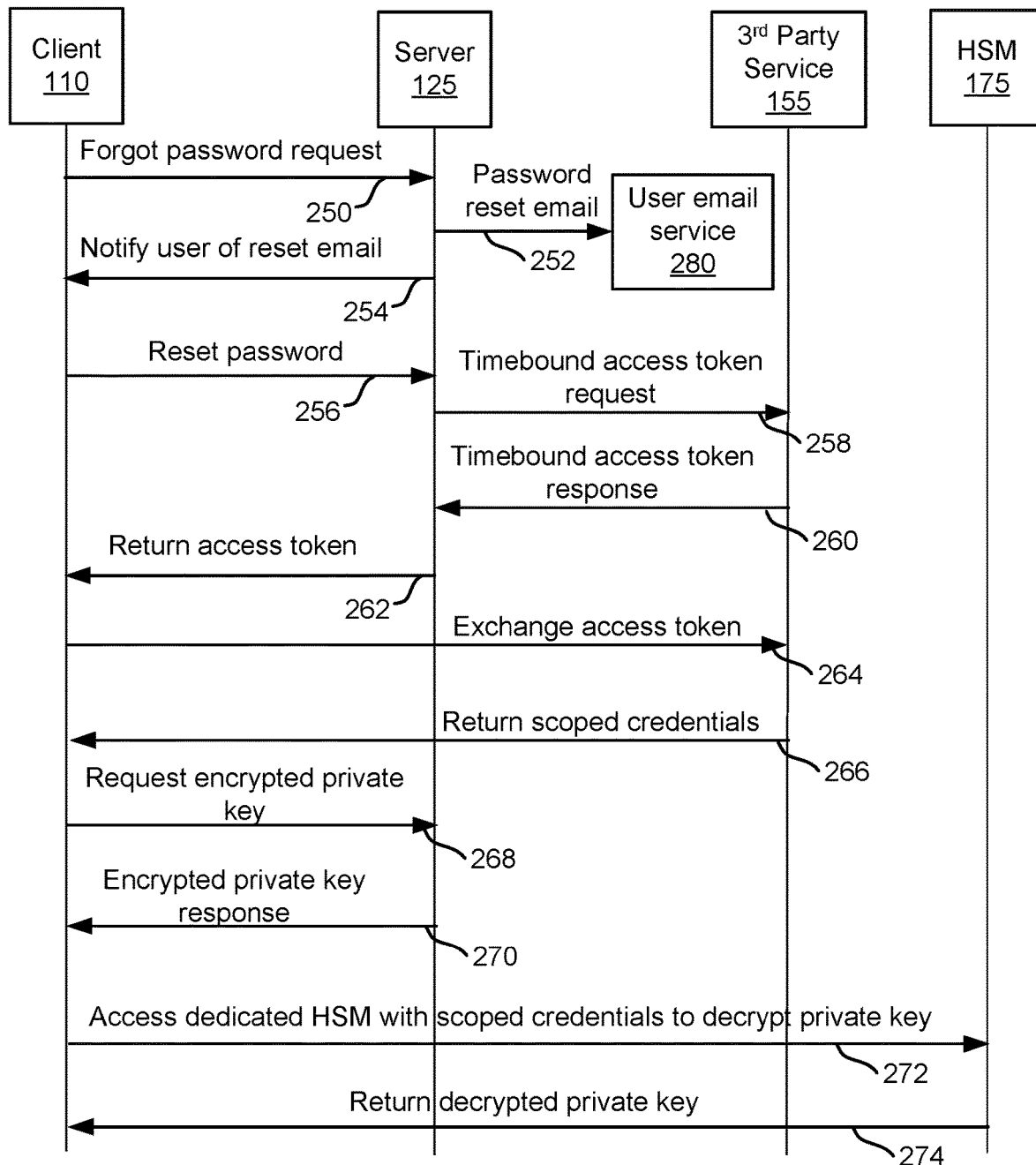
FIG. 2C illustrates a method for recovering a private key.

FIG. 2C illustrates a method for recovering a private key. The elements communicating in FIG. 2C include client 110, server 125, third party servers 155, and hardware security module 175. First, the client may send a message to server 125 regarding a forgotten password request at step 250. Server 125 may send an email to reset the user's password as message 252. The messages sent to the user's email service 280. Users then notified at client 110 and that the server ascent the password reset email at step 254. A user may reset their password and a resent password message is sent from client 110 to server 125 at step 256. A time bound access token request is then sent by server 125 to third-party service 155 at step 258. The third-party service receives the request and generates a time bound access token, and transmits the token to server 125 at step 260. Server 125 receives the token and forwards the access token to client 110 at step 262.

Client 110 may transmit an access token to the third-party service at step 264. The third-party service 155 may receive the token and transmits scoped credentials for the user back to the client at step 266. Upon receiving the scoped credentials, the client may request an encrypted private key from the server at step 268. When the client initially generates the encrypted private key, a copy is sent to the server 125 in case the user needs to recover their credentials. The server provides encrypted private key in response to the client's request at step 270. The scoped credentials and the private key are transmitted to the hardware security module from client 110 at step 272, with a request to decrypt the private key. The hardware security module 175 receives requests, decrypts the private key, and returns the decrypted private key to client 110 at step 274.

Figure 3:
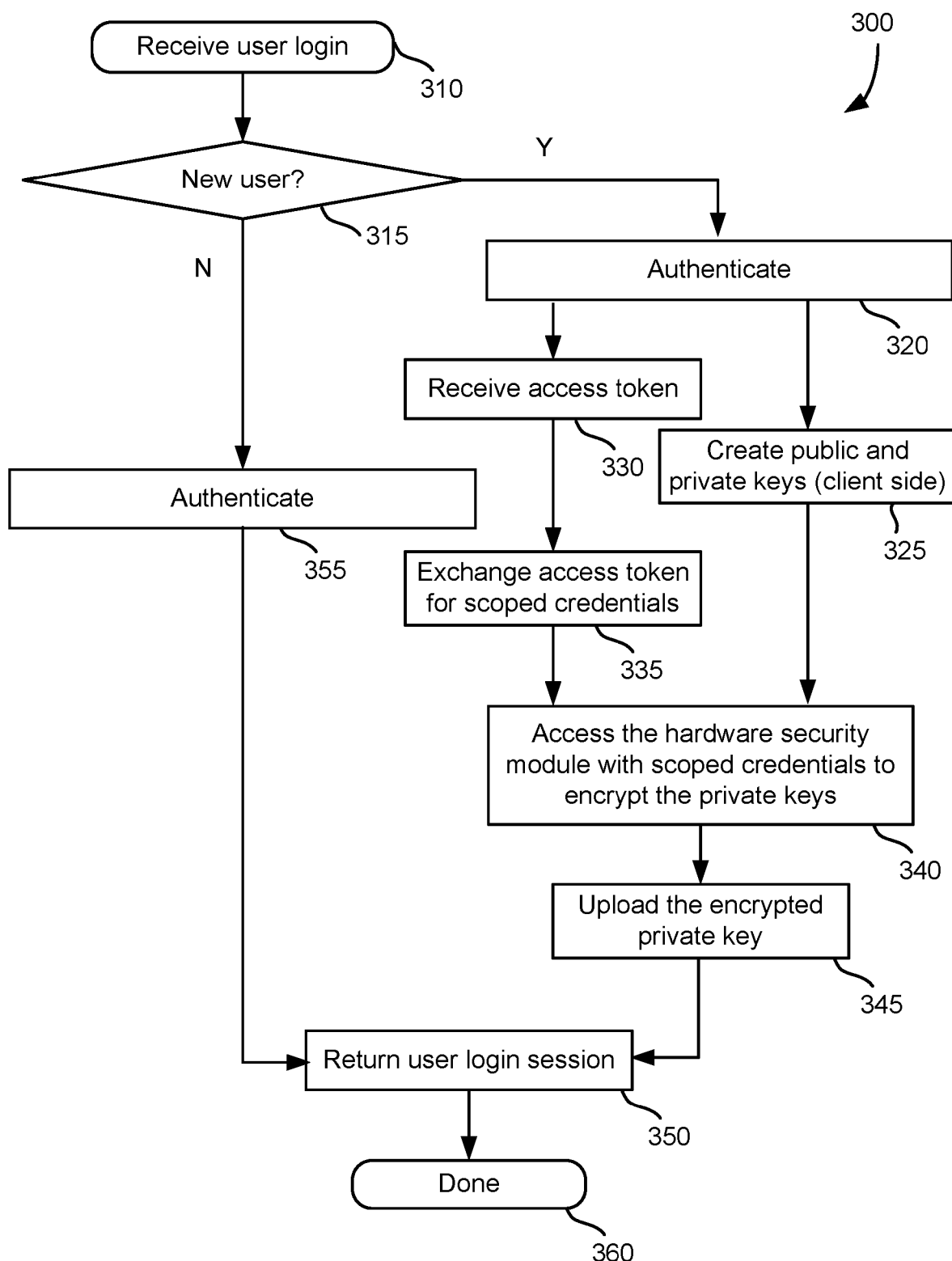
FIG. 3 is an exemplary method of a login process for a delegated key management system.

FIG. 3 is an exemplary method of a login process for a delegated key management system. User information, such as for example a phone number, email, or other information, is provided by the user and received at the client at step 310. Though a phone number is discussed with respect to the method of FIG. 3, other information can be received from a user to perform login, such as an email, username, or other information. The phone number received by client 110 is provided to server 125. A determination is made at server 125 as to whether the phone number is associated with an existing account or is a new phone number at step 315. If the phone number is associated with an account and is not a new phone number, the user is authenticated using the phone number at step 355. The method of FIG. 3 then returns to the login session at step 350 and the login process ends at step 360.

If the provided user information is a new phone number, email or other information at step 315, then a setup process is initiated for the user. First, authentication is performed at step 320. An access token is then received at step 330. The access token may be received by the user at client 110. More details for receiving an access token are discussed with respect to the method of FIG. 3. The access token may then be exchanged for scoped credentials at step 335. The access token can only be exchanged for the credentials directly with the third-party system. More detail for step 335 is discussed with respect to the method of FIG. 4.

Concurrently with step 320-335, a public key and private key are created at step 325. The public and private key may be generated in the browser of a client device 110. A hardware security module with scoped credentials is accessed to encrypt the private keys at step 340 on a client device 110, which completely bypasses server 125. In this manner, a user is required to interact with the hardware security module with the scoped credentials in order to encrypt the private keys. More detail for step 340 is discussed with respect to the method of FIG. 5.

After encryption of the private keys, the encrypted private key is uploaded at step 345 and the user login session continues at step 350. The method of FIG. 3 then ends at step 360.

Figure 4:
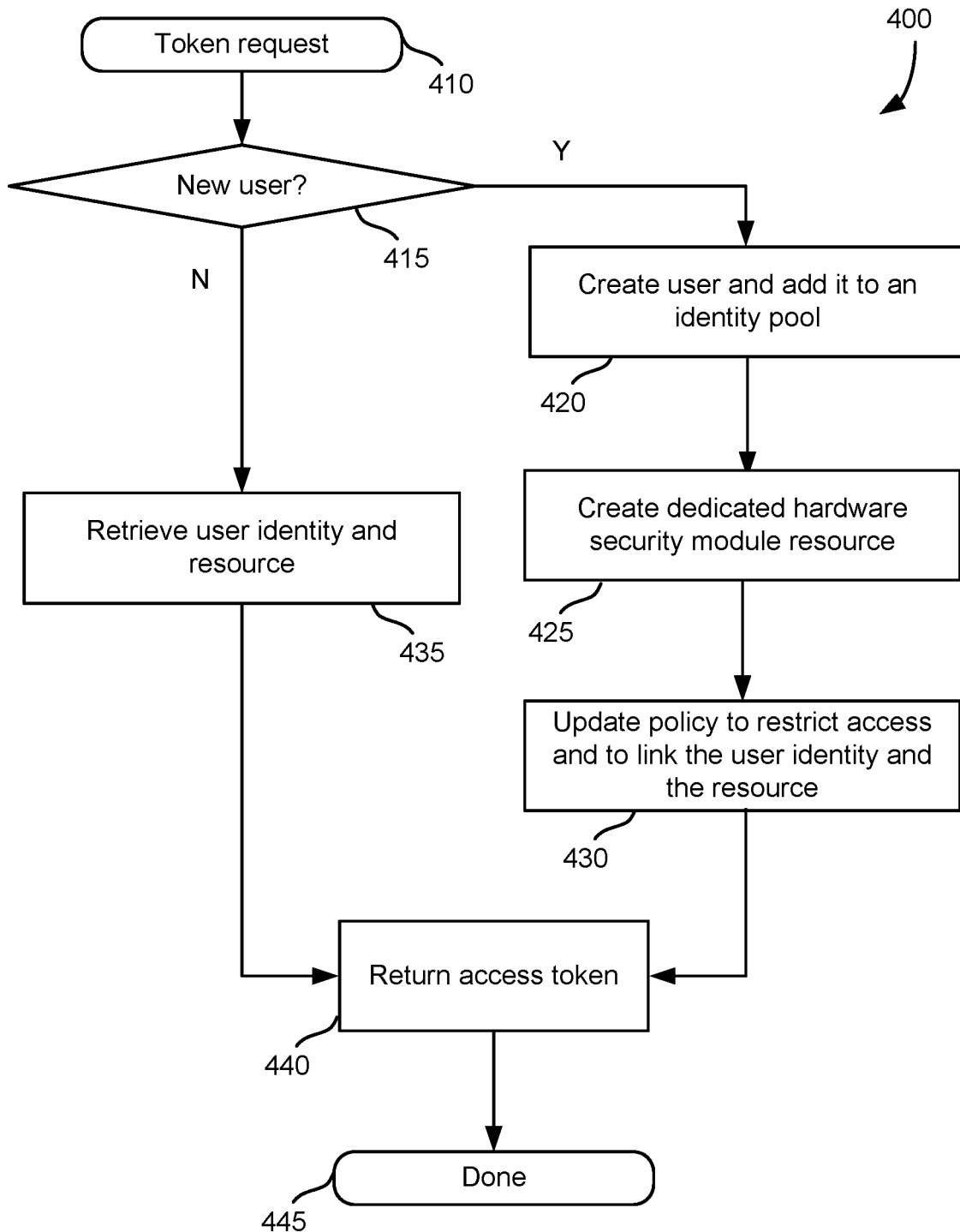
FIG. 4 is an exemplary method for requesting an access token.

FIG. 4 is an exemplary method for requesting a token. The method of FIG. 4 provides more detail for step 230 of the method of FIG. 2. First, a token request is received at step 410. A determination is then made at step 415 as to whether the token request is associated with a new user. If the request is not from a new user, a user identity and resources retrieved at step 435. In some instances, the user identity and resource may be specific to the third-party. The method then continues to step 440 where the access token is returned to the user at step 440, and the method of FIG. 4 ends at step 445.

If at step 415 the user is determined to be a new user based on the token request, a user account is created and added to an identity pool at step 420. Optionally, a dedicated hardware security module resource is then created at step 425. In some instances, the dedicated hardware security resource may be created for pool, rather than for a particular user. Hence, a dedicated hardware security module resource may only be created at step 425 if an additional pool is needed once the user is created. A policy is updated to restrict access and to link the user identity and the resource at step 430. The access token from the newly created user is then returned at step 440, and the method ends at step 445.

Figure 5:
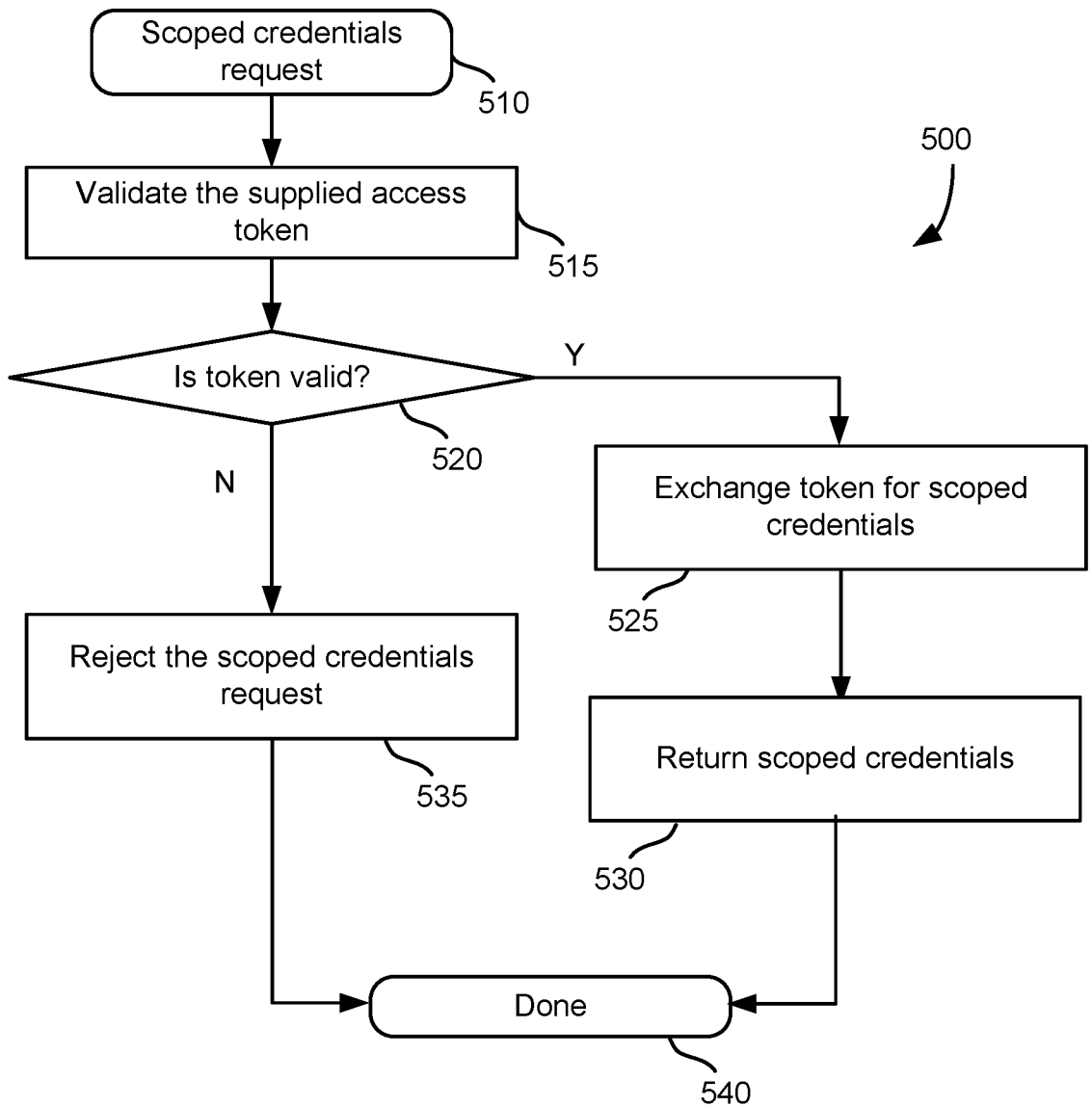
FIG. 5 is an exemplary method for determining scoped credentials.

FIG. 5 is an exemplary method for determining scoped credentials. First, a scoped credentials request is received at step 510. The supplied access token is then validated at step 515. A determination is made as to whether the token is valid at step 520. If the token is not valid, the scoped credentials request is rejected at step 535 and the process of FIG. 5 ends at step 540.

If the token is determined to be valid at step 520, the token is exchanged for scoped credentials at step 525. In some instances, users are directed to a site, wherein the token is exchanged for scoped credentials associated with a particular user identity pool. A user will then have permissions associated with a pool to access particular resources. The scoped credentials are then returned to a user at step 530. The credentials are returned to a client by the third-party system. In some instances, to implement a delegated key management system, the credentials must be returned by the third-party system. The method of FIG. 5 then ends at step 540.

Figure 6:
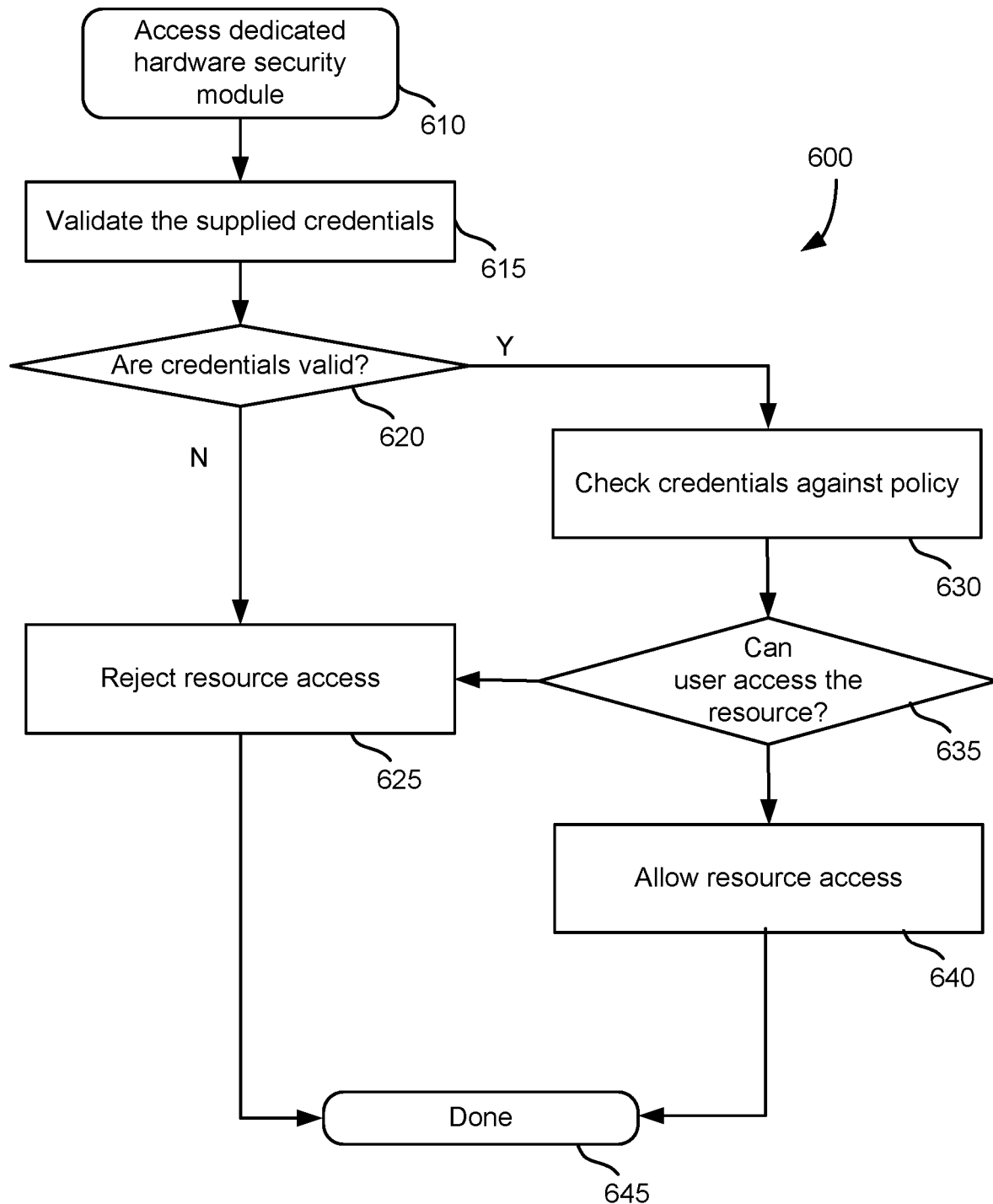
FIG. 6 is an exemplary method for determining permission.

FIG. 6 is an exemplary method for determining permission. The method of FIG. 6 provides more detail for step 240 the method of FIG. 2 First, a dedicated hardware security module is accessed at step 610. User supplied credentials are then validated at step 615, and a determination is made as to whether the user credentials are valid at step 620. In some instances, when a user receives credentials back from a third-party service, the third-party service may subsequently determine if the credentials are valid. If the credentials are not valid, the resource access is rejected at step 625 and the method of FIG. 6 ends at step 645.

If the credentials are determined to be valid at step 620, the credentials are checked against a policy at step 630. The policy is applied to uses associated with a particular user pool. There is an assumed role, and anyone who authenticates against the specific user pool is checked with their credentials. If authentication is successful, a user can become the specified role. The specific role will have a specific policy attached to the role.

After checking credentials against the policy, a determination is made as to whether the user can access the resource at step 635. If a user does not have permission to access the resource, resource access is rejected at step 625 and the method continues to step 645. If a user can access the resource, as determined by the third-party system, resource access is allowed at step 640 and the method of FIG. 6 ends at step 645.

In some instances, the present technology can be used to sign transactions. Transaction data can be signed based on an encrypted private key. The signed transaction data can be submitted for storage at a plurality of linked peer-to-peer computers that store data in blocks that are linked together.

Figure 7:
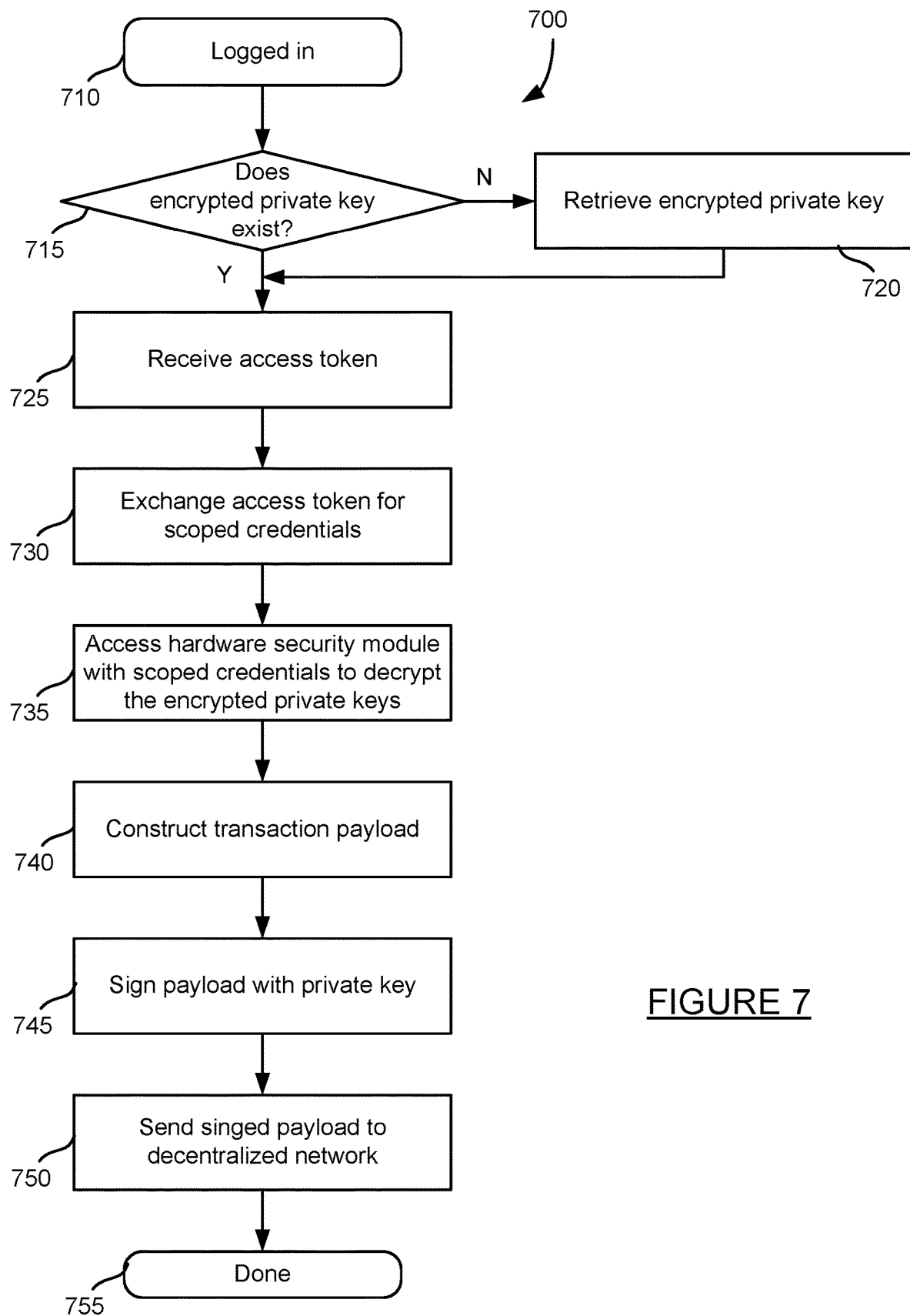
FIG. 7 is an exemplary method for sending a decentralized application transaction.

FIG. 7 is an exemplary method for sending a decentralized application transaction. First, a user is logged in at step 710. After login, a determination is made at step 715 as to whether encrypted private key exists on the client 110 for the login user. If an encrypted private key exists, the access token is received at step 725. If the encrypted private key does not exist for the user, encrypted private key is retrieved at step 720, and the method continues to step 725.

An access token is received at step 725. The access token is then exchanged for scoped credentials at step 730. Next, a hardware security module with scoped credentials is accessed to decrypt the encrypted private keys at step 735.

A payload is constructed at step 740. The payload is constructed for use on a platform for decentralized applications. In some instances, the platform may be a global platform for decentralized applications. Once the decryption and encryption are completed with a private key, user can use it on a client site for execution operations. A payload is then signed using the private key at step 745. The sign payload is then sent to the decentralized application platform network at step 750. The method of FIG. 7 then ends at step 755.

Figure 8:
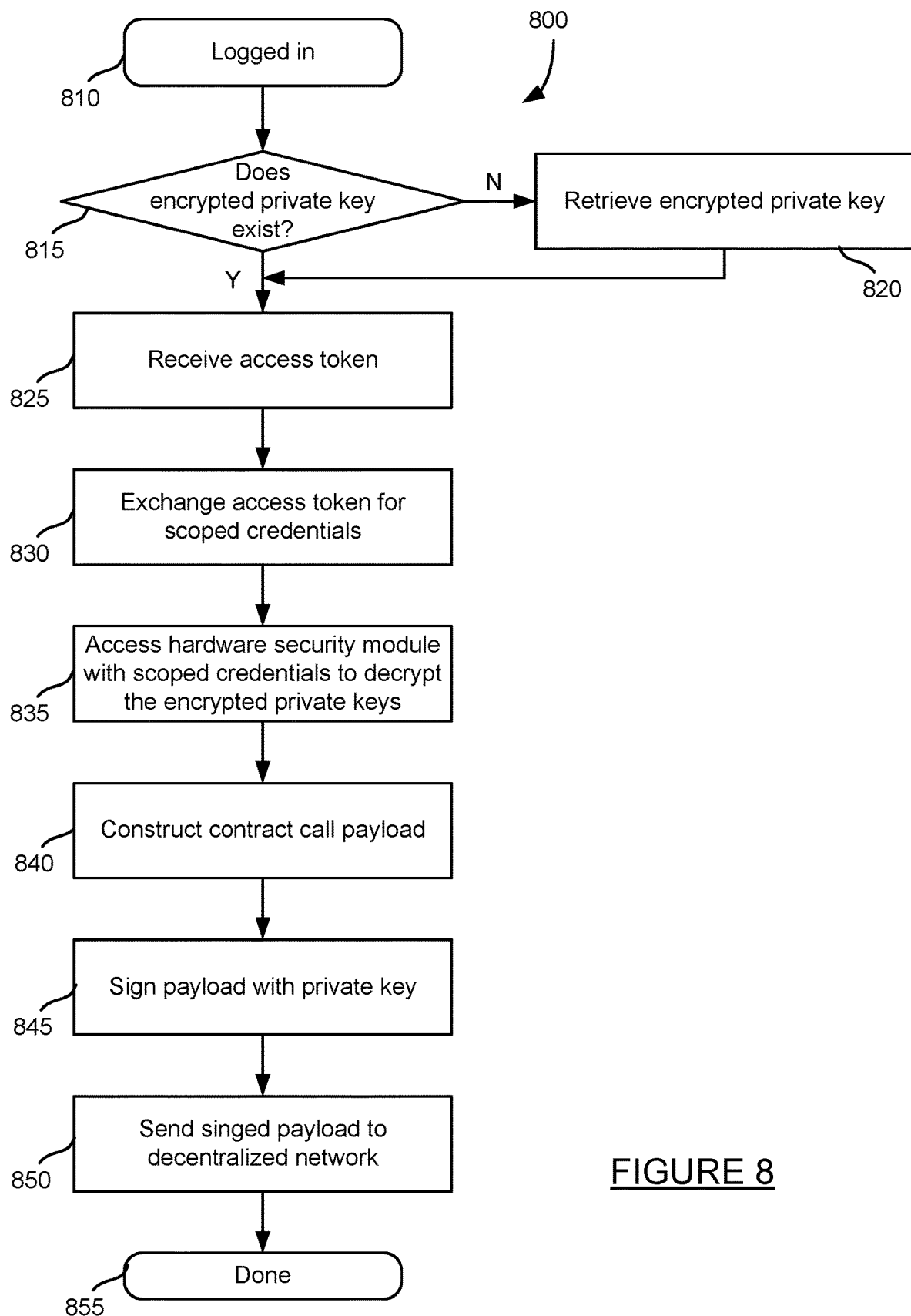
FIG. 8 is an exemplary method for sending a decentralized contract function.

FIG. 8 is an exemplary method for sending a decentralized contract function. A user logs in at step 810. The login process is discussed in more detail with respect to the method of FIG. 2. After login, a determination is made as to whether an encrypted private key exists on the client 110 for the logged in user at step 815. If encrypted private key exists, the method of FIG. 8 continues to step 825. If an encrypted private key does not already exist, the encrypted private key is retrieved at step 820, and the method continues to step 825.

An access token is received at step 825. The access token may then be exchanged for the scoped credentials at step 830. A hardware security module with scoped credentials can be accessed to decrypt the encrypted private keys at step 835. A contract call payload may then be constructed at step 840. In some instances, the payload can be construed for a decentralized application.

A payload can be signed with a private key at step 845, and the signed payload is then sent to the decentralized application platform at step 850. The method of FIG. 8 then ends at step 855.

Figure 9:
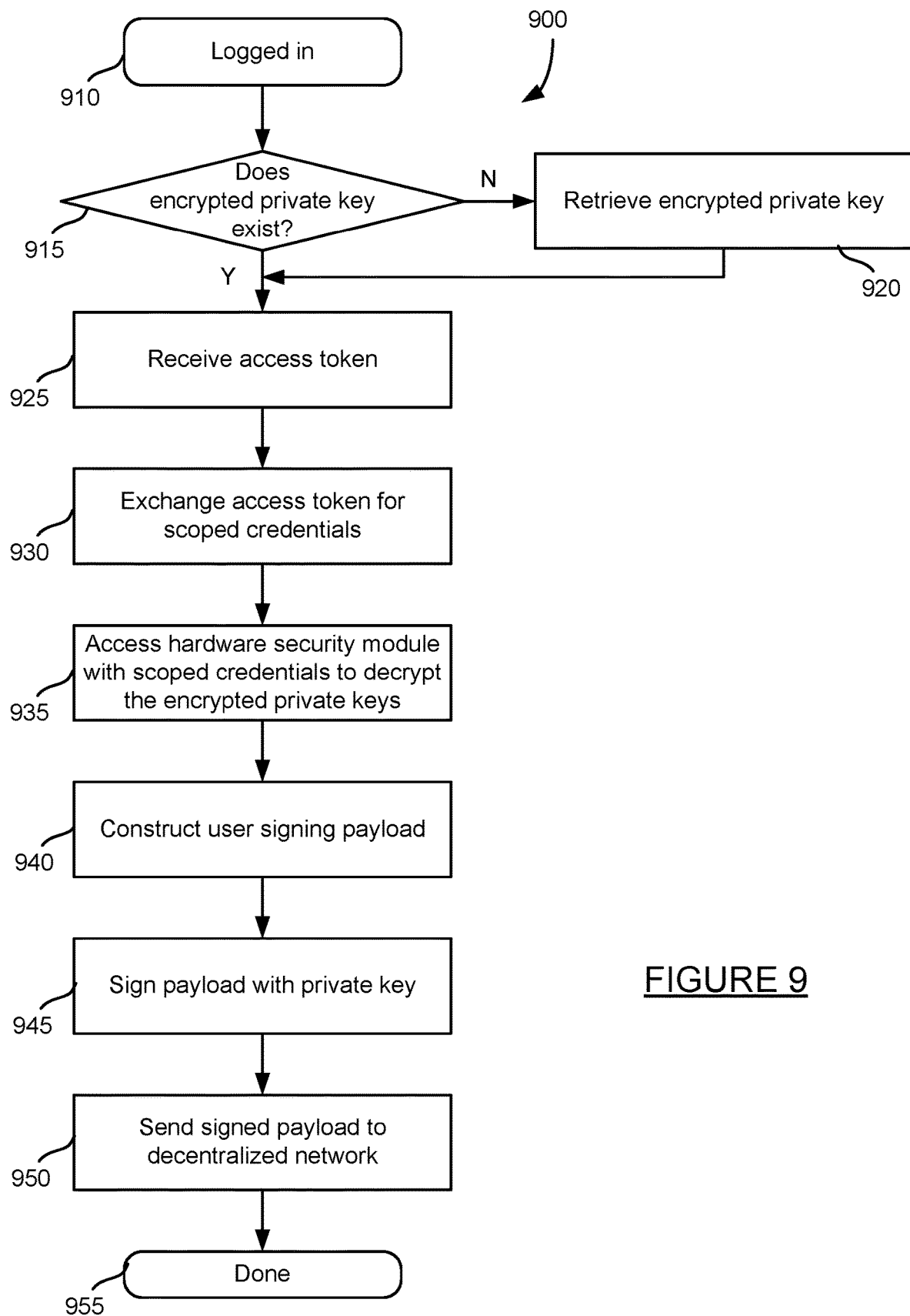
FIG. 9 is an exemplary method for performing a decentralized user signing.

FIG. 9 is an exemplary method for performing a decentralized user signing. A user is logged in at step 910. User login proceeds as discussed with respect to the method of FIG. 2. After login, a determination is made as to whether a private key exists on the client 90 for the user at step 915. If a user key exists, the method of FIG. 9 continues to step 925. If the private key does not exist, encrypted private key is retrieved for the logged in user at step 920 and the method of FIG. 9 continues to step 925.

An access token is received at step 925. The access token may then be exchanged for the scoped credentials at step 930. A hardware security module with scoped credentials can be accessed to decrypt the encrypted private keys at step 935.

A payload can then be signed with a private key at step 945. The signed payload can then be sent to a decentralized application platform at step 950. The method of FIG. 9 then ends at step 955.

Figure 10:
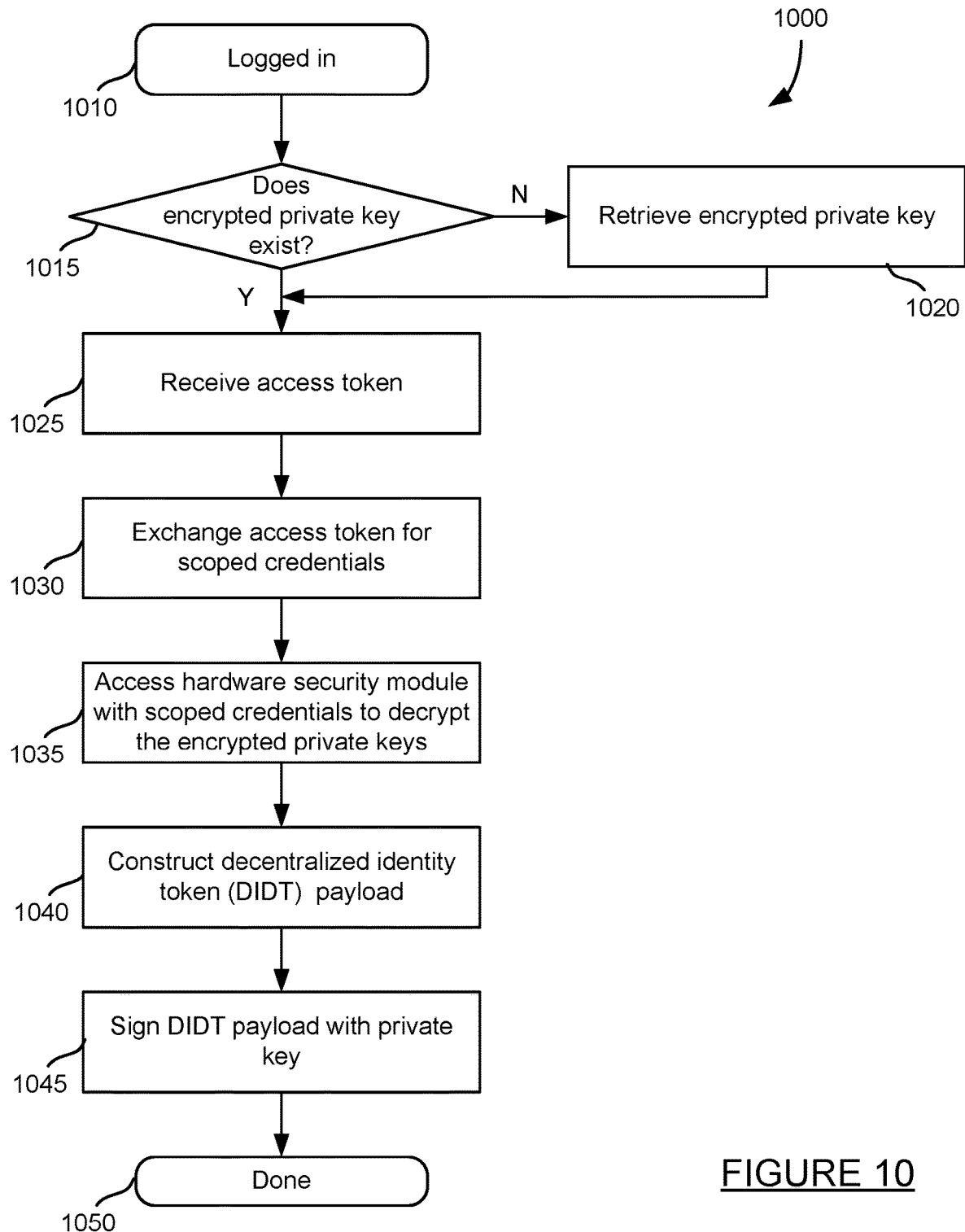
FIG. 10 is an exemplary method for generating a decentralized identifier token.

FIG. 10 is an exemplary method for generating a decentralized identifier token. A user is logged in at step 1010. At some point while the user is logged in, a determination is made as to whether an encrypted private key exists at step 1015. If encrypted private key does not exist, encrypted private key is retrieved at step 1020. The method of FIG. 10 then continues to step 1025. If the encrypted private key does exist, the system receives an access token at step 1025. The access token is an exchanged for scoped credentials by the client from a hardware security module at step 1030. The hardware security module is accessed with the scoped credentials to decrypt the encrypted private keys at step 1035. A decentralized identifier token (DIDT) payload is constructed at step 1040. The DIDT payload is signed with a private key at step 1045. The method of FIG. 10 then ends at step 1050.

Figure 11:
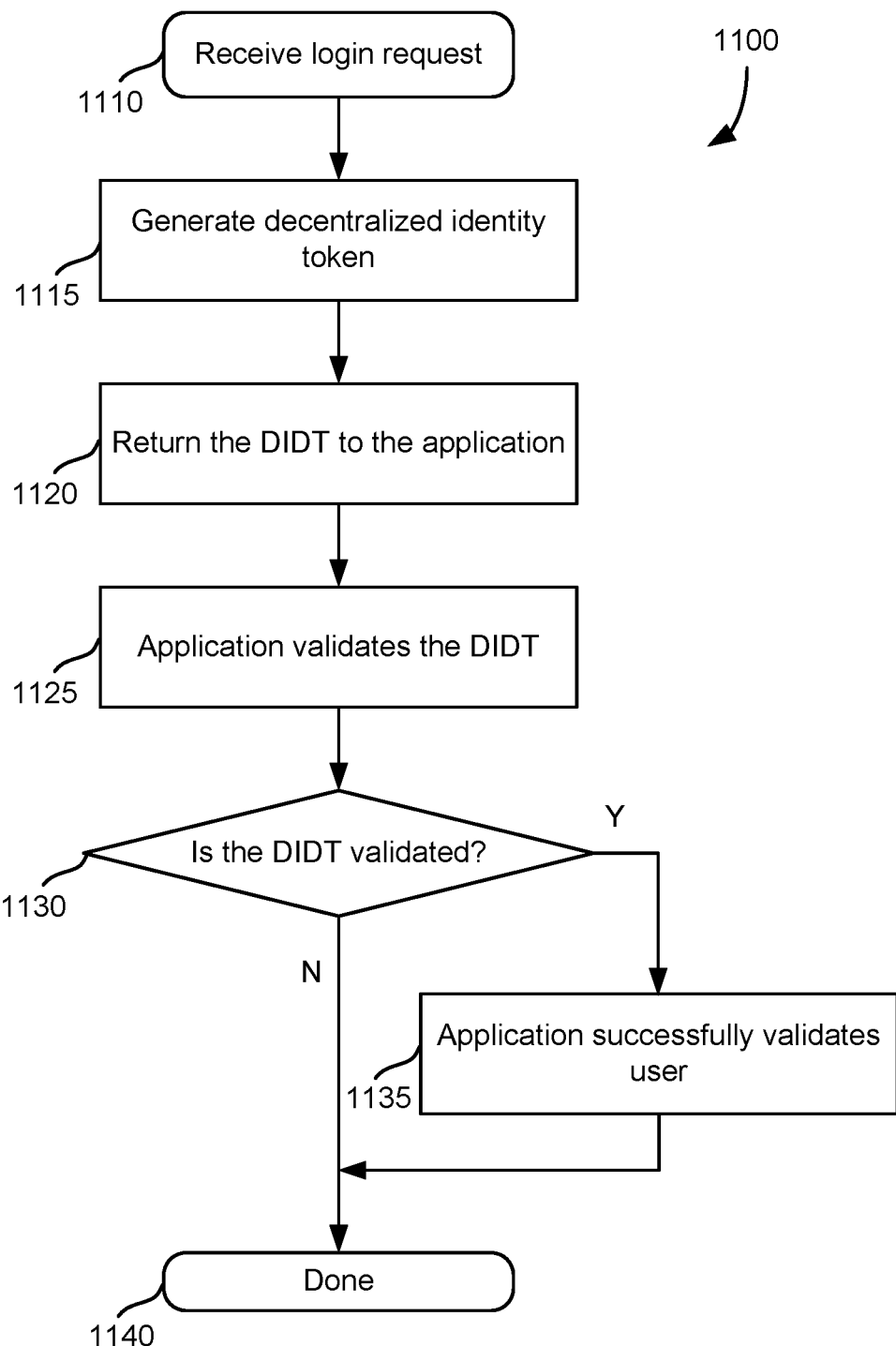
FIG. 11 is an exemplary method for performing application authentication with a decentralized identifier token.

FIG. 11 is an exemplary method for performing application authentication with a decentralized identifier token. A login request is received at step 1110. A decentralized identifier token (DIDT) is then generated at step 1115. The DIDT may be generated at the client, for example by a client application or a network browser iframe. The method of FIG. 10 provides more detail for generating a DIDT token. The DIDT is then returned to the application at step 1120. The application can validate the decentralized identifier token at step 1125. A determination is then made as to whether the decentralized identifier token is validated at step 1130. If the token is not validated, then the method of FIG. 11 ends at step 1140. If the token is validated by the application, the application successfully validates the user at step 1135. The method of FIG. 11 then ends at step 1140.

Figure 12:
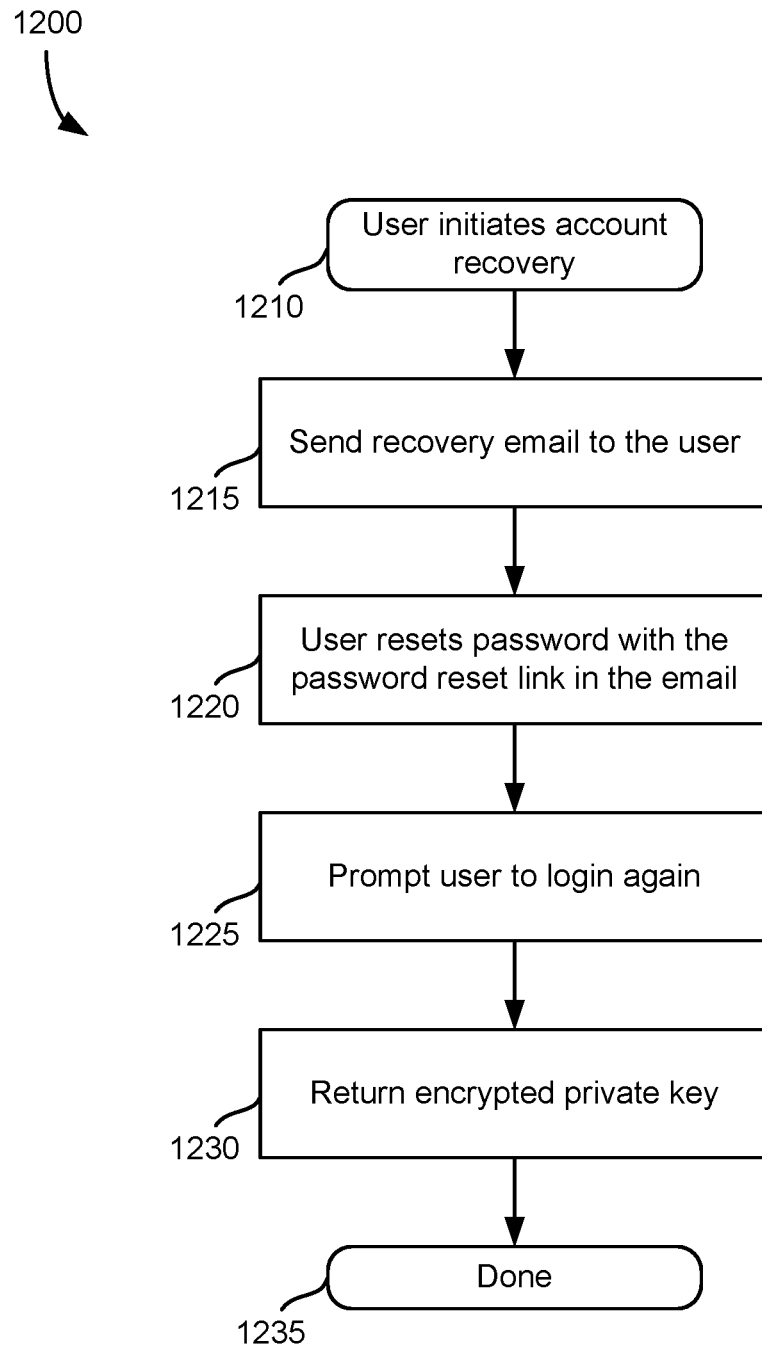
FIG. 12 is an exemplary method for performing account recovery.

FIG. 12 is an exemplary method for performing account recovery. A request to initiate account recovery is received from a user at step 1210. The recovery emails are sent to the user at step 1215. A user may reset the password with a password reset link provided to the user via email and at step 1220. Once the password has been reset, user may be prompted to perform login again at step 1225. Encrypted private key may then be returned to user at step 1230. The method of FIG. 12 then ends at step 1235.

Figure 13:
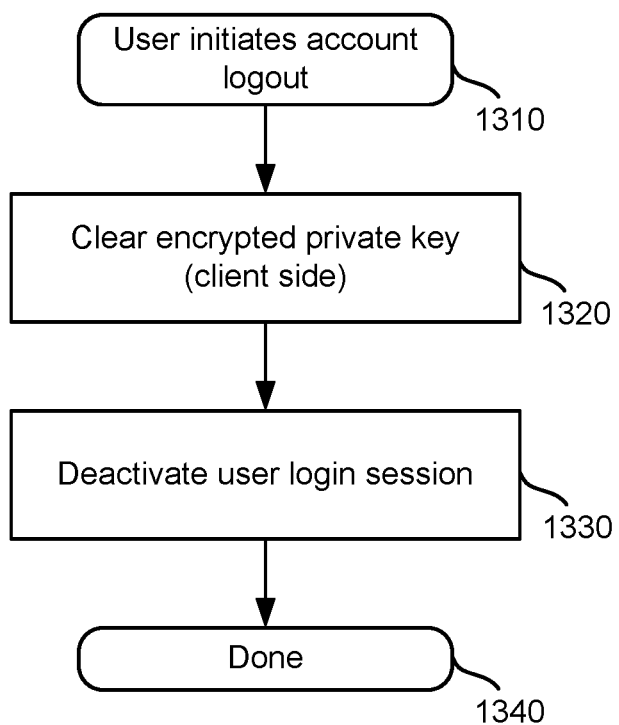
FIG. 13 is an exemplary method for logging out a user.

FIG. 13 is an exemplary method for logging out a user. A first, the user is logged out at step 1310. An encrypted private key for the user is cleared at the client-side for the user at step 1320. A user login session is then deactivated at step 1330. The method of FIG. 13 then ends at step 1340.

Figure 14:
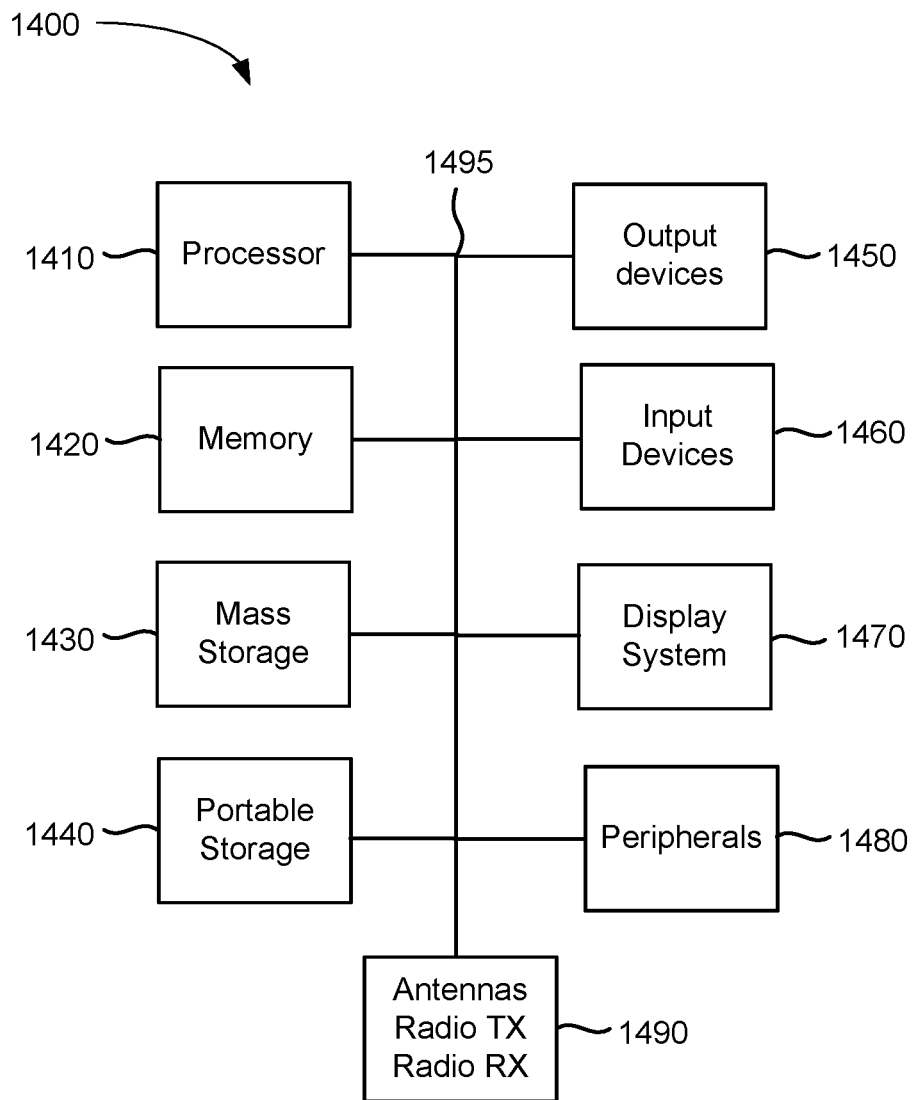
FIG. 14 is a block diagram of a computing environment for implementing the present technology.

FIG. 14 is a block diagram of a computing environment for implementing in the present technology. System 1400 of FIG. 14 may be implemented in the contexts of the likes of machines that implement battery client 140, server 145, and third-party system 155. The computing system 1400 of FIG. 14 includes one or more processors 1410 and memory 1420. Main memory 1420 stores, in part, instructions and data for execution by processor 1410. Main memory 1420 can store the executable code when in operation. The system 1400 of FIG. 14 further includes a mass storage device 1430, portable storage medium drive(s) 1440, output devices 1450, user input devices 1460, a graphics display 1470, and peripheral devices 1480.

The components shown in FIG. 14 are depicted as being connected via a single bus 1490. However, the components may be connected through one or more data transport means. For example, processor unit 1410 and main memory 1420 may be connected via a local microprocessor bus, and the mass storage device 1430, peripheral device(s) 1480, portable storage device 1440, and display system 1470 may be connected via one or more input/output (I/O) buses.

Mass storage device 1430, which may be implemented with a magnetic disk drive, an optical disk drive, a flash drive, or other device, is a non-volatile storage device for storing data and instructions for use by processor unit 1410. Mass storage device 1430 can store the system software for implementing embodiments of the present invention for purposes of loading that software into main memory 1420.

Portable storage device 1440 operates in conjunction with a portable non-volatile storage medium, such as a floppy disk, compact disk or Digital video disc, USB drive, memory card or stick, or other portable or removable memory, to input and output data and code to and from the computer system 1400 of FIG. 14. The system software for implementing embodiments of the present invention may be stored on such a portable medium and input to the computer system 1400 via the portable storage device 1440.

Input devices 1460 provide a portion of a user interface. Input devices 1460 may include an alpha-numeric keypad, such as a keyboard, for inputting alpha-numeric and other information, a pointing device such as a mouse, a trackball, stylus, cursor direction keys, microphone, touchscreen, accelerometer, and other input devices. Additionally, the system 1400 as shown in FIG. 14 includes output devices 1450. Examples of suitable output devices include speakers, printers, network interfaces, and monitors.

Display system 1470 may include a liquid crystal display (LCD) or other suitable display device. Display system 1470 receives textual and graphical information and processes the information for output to the display device. Display system 1470 may also receive input as a touchscreen.

Peripherals 1480 may include any type of computer support device to add additional functionality to the computer system. For example, peripheral device(s) 1480 may include a modem or a router, printer, and other device.

The system of 1400 may also include, in some implementations, antennas, radio transmitters and radio receivers 1490. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1400 of FIG. 14 are those typically found in computer systems that may be suitable for use with embodiments of the present invention and are intended to represent a broad category of such computer components that are well known in the art. Thus, the computer system 1400 of FIG. 14 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A non-transitory computer readable medium, readable by at least one processor and comprising instructions stored thereon that when executed causes the at least one processor to:
   cause a client to send to an authentication service a sign-up request for setting up a user account associated with a decentralized application;
   cause the client to receive a message that includes an access token corresponding to the sign-up request;
   cause the client to generate at least a portion of a private key in a computing environment that is inaccessible by the decentralized application;
   cause the client to send, bypassing the authentication service, the access token to a third-party service to access a remote security resource for encrypting the at least a portion of the private key; and
   cause the client to send, bypassing the authentication service, the at least a portion of the private key to the remote security resource for encryption.

2. The non-transitory computer readable medium of claim 1, wherein the instructions, when executed, further cause the at least one processor to cause the client to upload an encrypted version of the at least a portion of the private key to the authentication service.

3. The non-transitory computer readable medium of claim 1, wherein the remote security resource is configured to encrypt the at least a portion of the private key with an unexportable master key.

4. The non-transitory computer readable medium of claim 1, wherein the instructions to cause the client to generate the at least a portion of the private key comprises instructions, when executed, further cause the at least one processor to cause the client to generate a public key associated with the at least a portion of a private key.

5. The non-transitory computer readable medium of claim 4, wherein the instructions to cause the client to generate the public key and the at least a portion of the private key comprises instructions, when executed, further cause the at least one processor to generate the public key and the at least a portion of the private key with a cryptographic pseudo random number generator.

6. The non-transitory computer readable medium of claim 1, wherein the instructions, when executed, further cause the at least one processor to cause the client to receive an encrypted version of the at least a portion of the private key within the computing environment.

7. The non-transitory computer readable medium of claim 1, wherein the instructions, when executed, further cause the at least one processor to:
   cause the client to receive from the third-party service scoped credentials corresponding to the access token and the remote security resource; and
   cause the client to send the scoped credentials to access the remote security resource.

8. The non-transitory computer readable medium of claim 1, wherein the remote security resource is a hardware security module.

9. The non-transitory computer readable medium of claim 1, wherein the instructions, when executed, further cause the at least one processor to cause the client to receive, based on a decryption request, a decrypted version of the at least a portion of the private key from the remote security resource in the computing environment.

10. The non-transitory computer readable medium of claim 9, wherein the instructions, when executed, further cause the at least one processor to cause the client to purge the decrypted version of the at least a portion of the private key from memory of the client.

11. The non-transitory computer readable medium of claim 1, wherein the computing environment is an iframe within a web browser.

12. A non-transitory computer readable medium, readable by a user device and comprising instructions stored thereon that are readable by a user device and configure the user device to:
   receive from an authentication system an access token in response to a sign-up request for setting up a user account of a decentralized application;
   generate at least a portion of a private key in an iframe of the user device that is isolated from the decentralized application;
   send the access token to a non-custodial key management system for accessing a hardware security module that is configured to encrypt the at least a portion of the private key using an unexportable master key; and
   send, without exposing the at least a portion of the private key to the authentication system, the at least a portion of the private key to the hardware security module for encryption.

13. The non-transitory computer readable storage medium of claim 12, wherein the instructions further configure the user device to upload an encrypted version of the at least a portion of the private key to the authentication system.

14. The non-transitory computer readable storage medium of claim 12, wherein the instructions further configure the user device to receive an encrypted version of the at least portion of the private key at the iframe.

15. The non-transitory computer readable storage medium of claim 12, wherein the instructions further configure the user device to:
   receive from the non-custodial key management system secured credentials generated in response to the access token; and
   send, without exposing the secured credentials to the authentication system, the secured credentials to access the hardware resource module for encryption.

16. The non-transitory computer readable storage medium of claim 12, wherein the instructions further configure the user device to receive in the iframe of the user device, in response to a decryption request, a decrypted version of the at least a portion of the private key from the hardware resource module.

17. The non-transitory computer readable storage medium of claim 12, wherein the instructions further configure the user device to purge the decrypted version of the at least portion of the private key from memory of the user device.

18. A system for setting up a wallet for a decentralized application that performs non-custodial authentication for a user account, the system comprising:
   memory; and
   at least one processor operatively coupled to the memory, wherein the at least one processor is configured to:

receive from an authentication service an access token in response to a sign-up request for setting up the user account of a decentralized application;

generate at least a portion of a private key in a computing environment that is inaccessible from the decentralized application and the authentication service;

send the access token to a key management service to access a remote security resource configured to encrypt the at least a portion of the private key using an unexportable master key; and send and bypass the authentication service the at least a portion of the private key to the remote security resource for encryption.

19. The system of claim 18, wherein the instructions, when executed, further cause the at least one processor to:

receive from the key management service secured credentials generated in response to the sending the access token; and send and bypass the authentication service the secured credentials to the key management service to access the remote security resource for encryption.

20. The system of claim 18, wherein the instructions, when executed, further cause the at least one processor to receive a decrypted version of the at least a portion of the private key from the remote security resource in the computing environment in response to a decryption request.

\* \* \* \* \*

UNITED STATES PATENT AND TRADEMARK OFFICE
CERTIFICATE OF CORRECTION

PATENT NO. : 11,968,206 B2
APPLICATION NO. : 18/468531
DATED : April 23, 2024
INVENTOR(S) : Jen et al.

It is certified that error appears in the above-identified patent and that said Letters Patent is hereby corrected as shown below:

In the Specification

In Column 4, Line 49, delete "205" and insert --202-- therefor

In Column 8, Line 58, delete "90" and insert --900-- therefor

In Column 9, Line 53, delete "140," and insert --110,-- therefor

In Column 9, Line 53, delete "145," and insert --125,-- therefor

In the Claims

In Column 12, Line 42, in Claim 14, before "portion", insert --a--

In Column 12, Line 61, in Claim 17, before "portion", insert --a--

Signed and Sealed this
Fourth Day of June, 2024

Katherine Kelly Vidal
*Director of the United States Patent and Trademark Office*